United States Patent
Zhao

(10) Patent No.: US 10,411,389 B2
(45) Date of Patent: Sep. 10, 2019

(54) ELECTRICAL CONNECTOR HAVING A REAR RETAINER

(71) Applicant: FOXCONN INTERCONNECT TECHNOLOGY LIMITED, Grand Cayman (KY)

(72) Inventor: Jun Zhao, Huaian (CN)

(73) Assignee: FOXCONN INTERCONNECT TECHNOLOGY LIMITED, Grand Cayman (KY)

( * ) Notice: Subject to any disclaimer, the term of this patent is extended or adjusted under 35 U.S.C. 154(b) by 0 days.

(21) Appl. No.: 16/111,189

(22) Filed: Aug. 23, 2018

(65) Prior Publication Data

US 2019/0067860 A1 Feb. 28, 2019

(30) Foreign Application Priority Data

Aug. 24, 2017 (CN) .......................... 2017 1 0733126

(51) Int. Cl.
| | |
|---|---|
| *H01R 13/658* | (2011.01) |
| *H01R 24/60* | (2011.01) |
| *H01R 13/405* | (2006.01) |
| *H01R 13/6585* | (2011.01) |
| *H01R 13/504* | (2006.01) |
| *B29C 45/00* | (2006.01) |
| *H01R 13/52* | (2006.01) |
| *H01R 107/00* | (2006.01) |
| *H01R 12/70* | (2011.01) |

(52) U.S. Cl.
CPC ........... *H01R 13/405* (2013.01); *B29C 45/00* (2013.01); *H01R 13/504* (2013.01); *H01R 13/6585* (2013.01); *H01R 12/707* (2013.01); *H01R 13/521* (2013.01); *H01R 13/5202* (2013.01); *H01R 24/60* (2013.01); *H01R 2107/00* (2013.01)

(58) Field of Classification Search
None
See application file for complete search history.

(56) References Cited

U.S. PATENT DOCUMENTS

| | | | | |
|---|---|---|---|---|
| 9,379,494 | B1 * | 6/2016 | Hu | H01R 13/6594 |
| 9,466,924 | B2 * | 10/2016 | Lin | H01R 13/6585 |
| 9,496,664 | B2 * | 11/2016 | Little | H01R 13/6587 |
| 9,525,241 | B1 * | 12/2016 | Su | H01R 13/6581 |
| 9,893,473 | B2 * | 2/2018 | Kong | H01R 13/6594 |
| 2018/0097298 | A1 * | 4/2018 | Ju | H01R 13/04 |

FOREIGN PATENT DOCUMENTS

| | | |
|---|---|---|
| CN | 106374249 | 2/2017 |
| CN | 105375157 | 4/2018 |

\* cited by examiner

*Primary Examiner* — Xuong M Chung Trans
(74) *Attorney, Agent, or Firm* — Wei Te Chung; Ming Chieh Chang

(57) ABSTRACT

An electrical connector includes: a first insulator and a row of first contacts retained to the first insulator, each first contact having a rear tail; a second insulator and a row of second contacts retained to the second insulator, each second contact having a rear tail, the rear tails of the second contacts being arranged in front of the rear tails of the first contacts; a shielding plate assembled between the first insulator and the second insulator; a third insulator molded to an assembly of the first insulator, the second insulator, and the shielding plate; and a retainer extending through the first insulator, the second insulator, and the shielding plate, wherein the retainer is disposed between the third insulator and the rear tails of the first contacts.

20 Claims, 11 Drawing Sheets

ELECTRICAL CONNECTOR HAVING A REAR RETAINER

BACKGROUND OF THE INVENTION

1. Field of the Invention

The present invention relates to an electrical connector having a first insulator latched to a second insulator, a third insulator molded to the first and second insulators, and a retainer secured to the first and second insulators behind the third insulator.

2. Description of Related Arts

U.S. Pat. No. 9,912,086 discloses an electrical connector comprising a first insulator and a row of first contacts retained to the first insulator, a second insulator and a row of second contacts retained to the second insulator, a shielding plate assembled between the first insulator and the second insulator, a third insulator molded to an assembly of the first insulator, the second insulator, and the shielding plate, and a retainer extending through the first insulator, the second insulator, and the shielding plate, wherein the retainer is constructed of a pair of posts disposed behind the third insulator on two lateral sides of the two rows of contacts.

SUMMARY OF THE INVENTION

An electrical connector comprises: a first insulator and a row of first contacts retained to the first insulator, each first contact having a rear tail; a second insulator and a row of second contacts retained to the second insulator, each second contact having a rear tail, the rear tails of the second contacts being arranged in front of the rear tails of the first contacts; a shielding plate assembled between the first insulator and the second insulator; a third insulator molded to an assembly of the first insulator, the second insulator, and the shielding plate; and a retainer extending through the first insulator, the second insulator, and the shielding plate, wherein the retainer is disposed between the third insulator and the rear tails of the first contacts.

DETAILED DESCRIPTION OF THE PREFERRED EMBODIMENT

Figure 1:
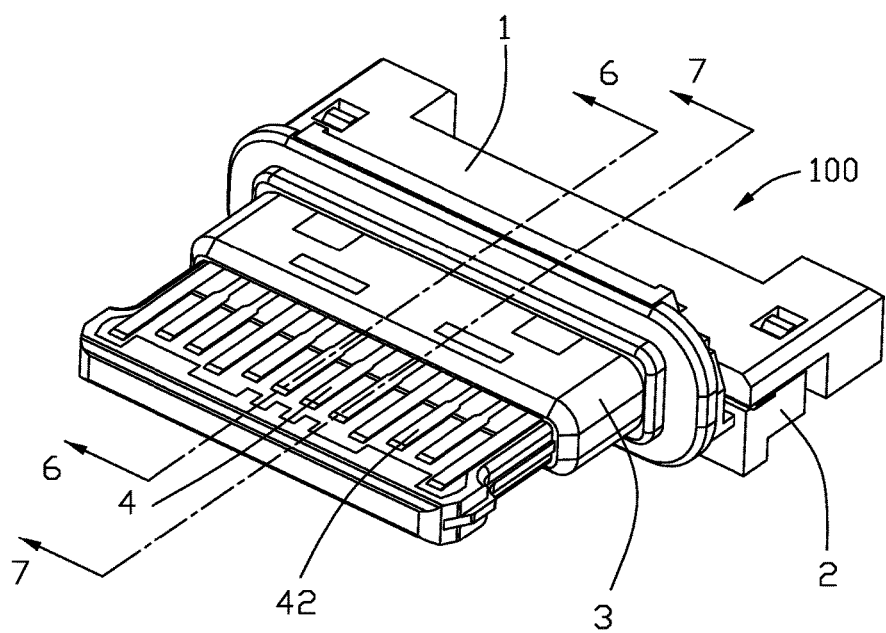
FIG. 1 is a front and top perspective view of an electrical connector in accordance with the present invention.
Figure 2:
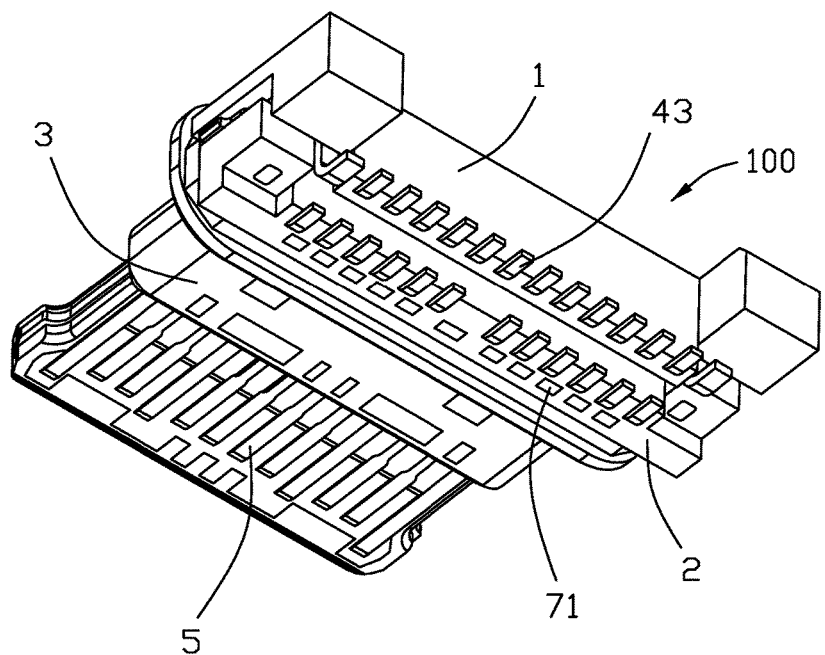
FIG. 2 is a rear and bottom perspective view of the electrical connector.
Figure 3:
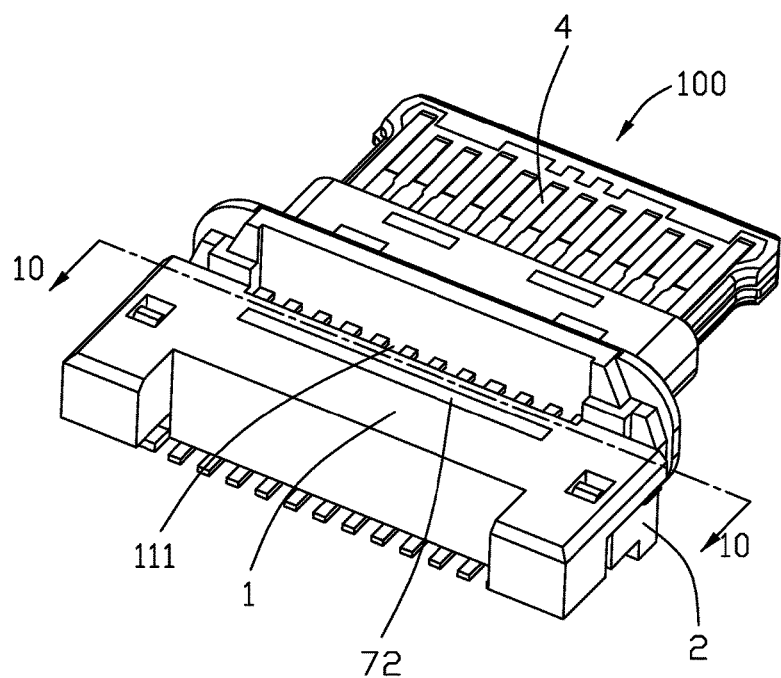
FIG. 3 is a rear and top perspective view of the electrical connector.
Figure 4:
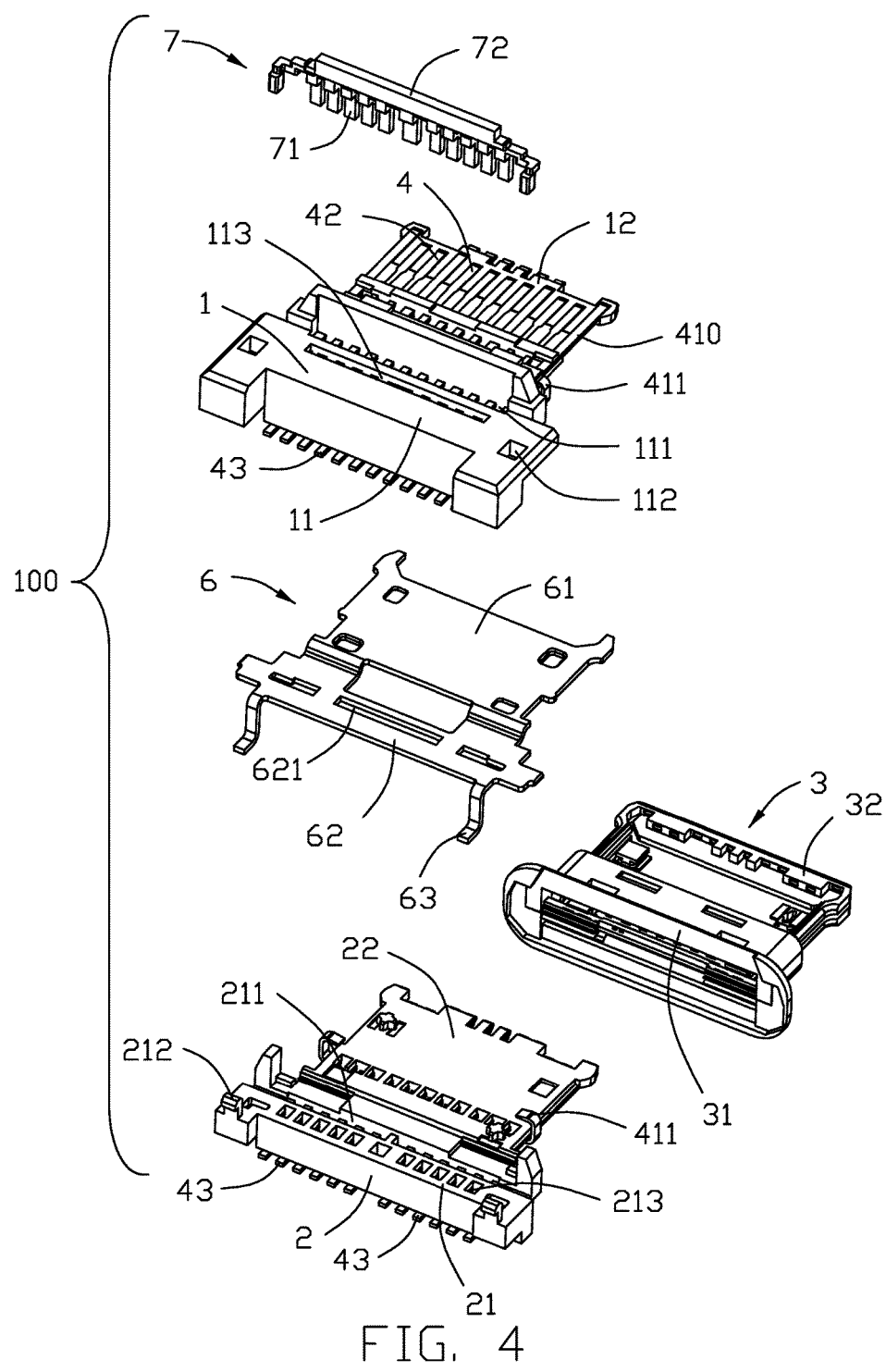
FIG. 4 is an exploded view of the electrical connector in FIG. 3.
Figure 5:
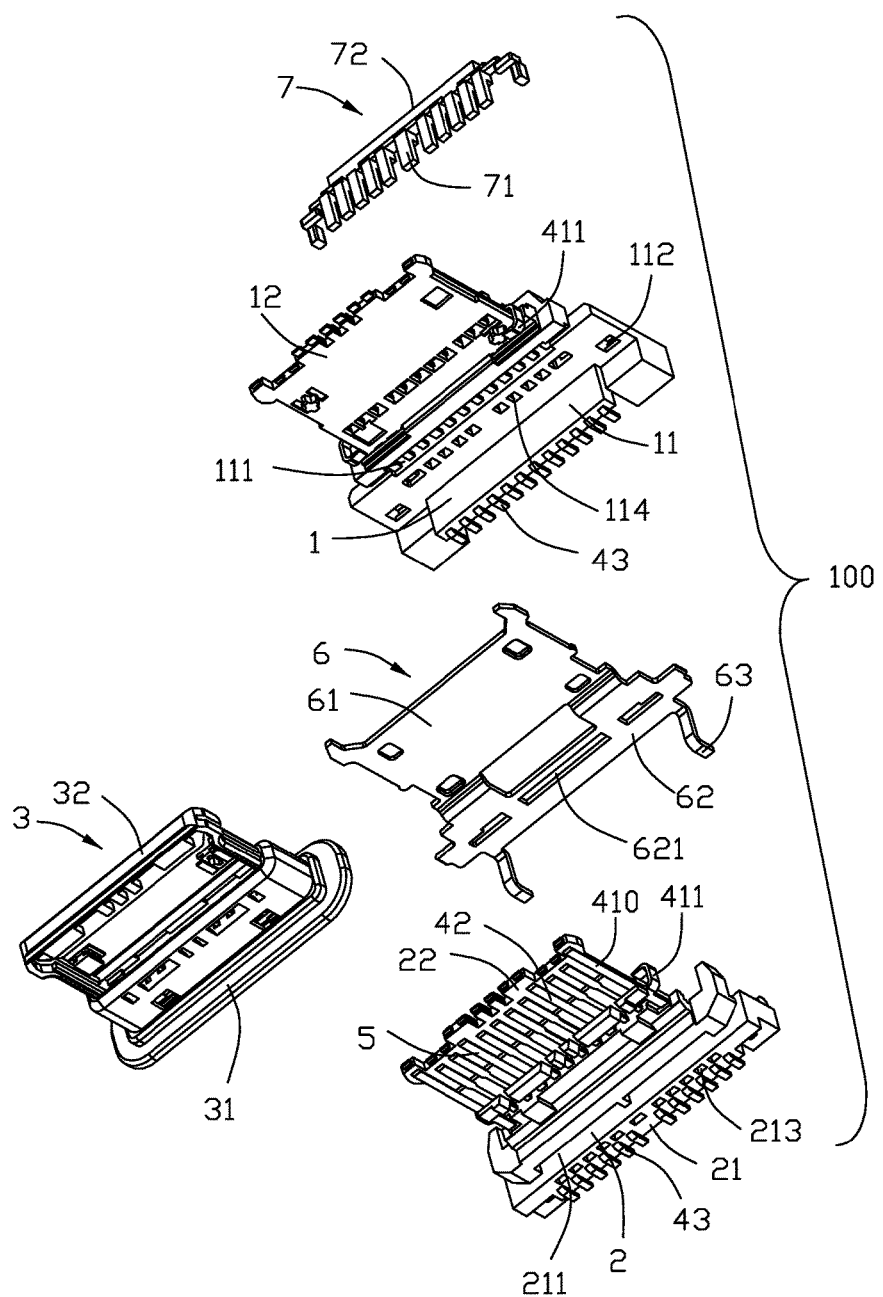
FIG. 5 is a view of FIG. 4 from another perspective.
Figure 6:
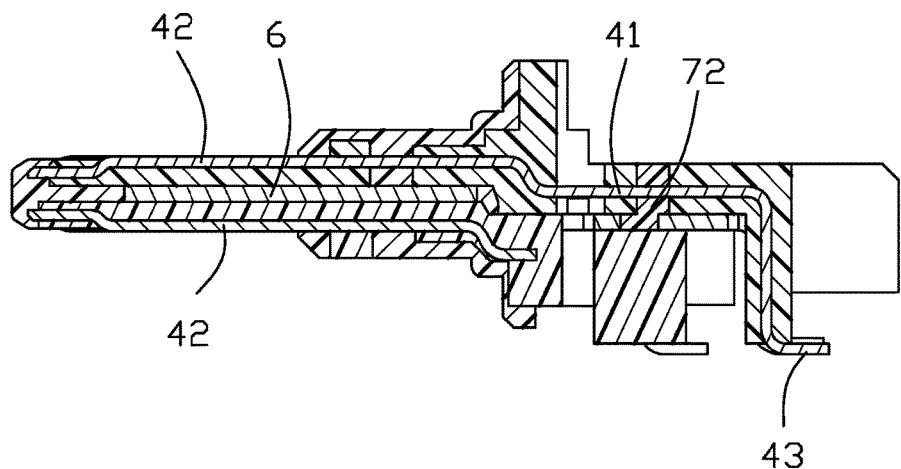
FIG. 6 is a cross-sectional view of the electrical connector taken along line 6-6 in FIG. 1.
Figure 7:
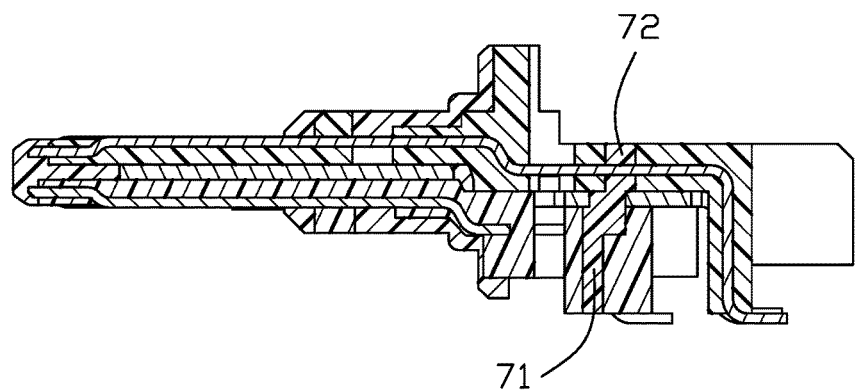
FIG. 7 is a cross-sectional view of the electrical connector taken along line 7-7 in FIG. 1.
Figure 8:
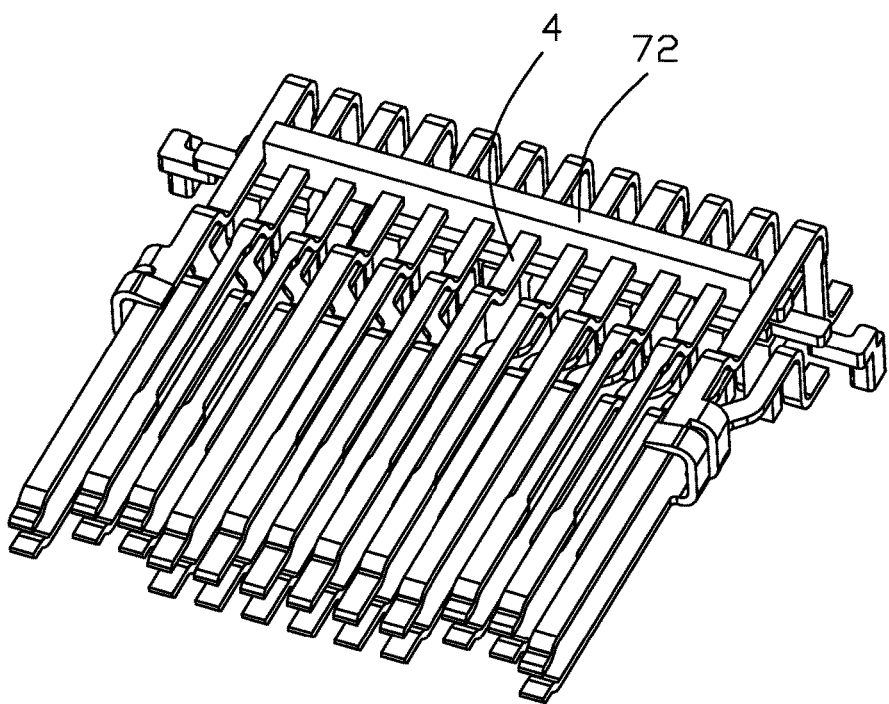
FIG. 8 is a perspective view to show the structural relation between the retainer and the upper contacts with the lower contacts thereabouts.
Figure 9:
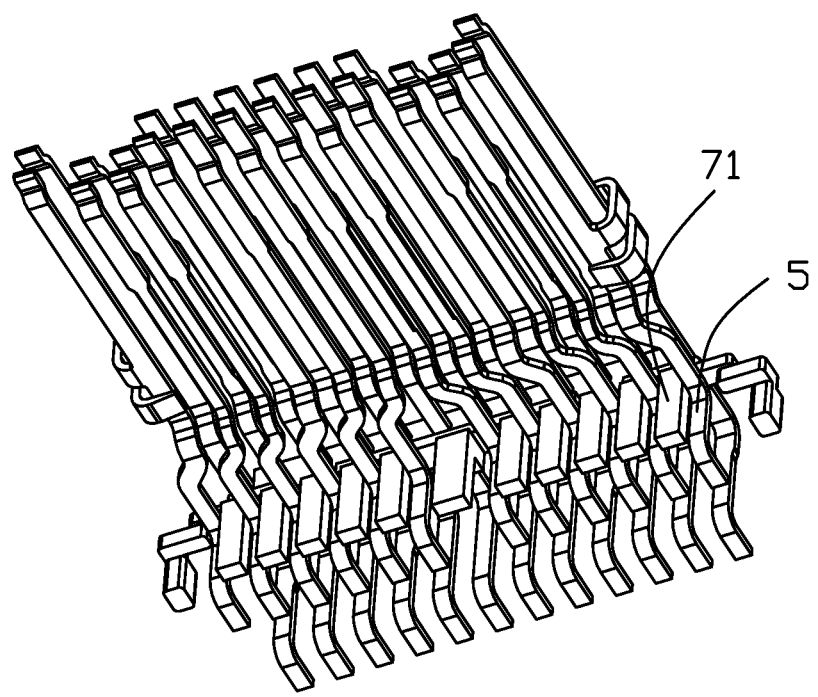
FIG. 9 is a perspective view to show the structural relation between the retainer and the lower contacts with the upper contacts thereabouts.
Figure 10:
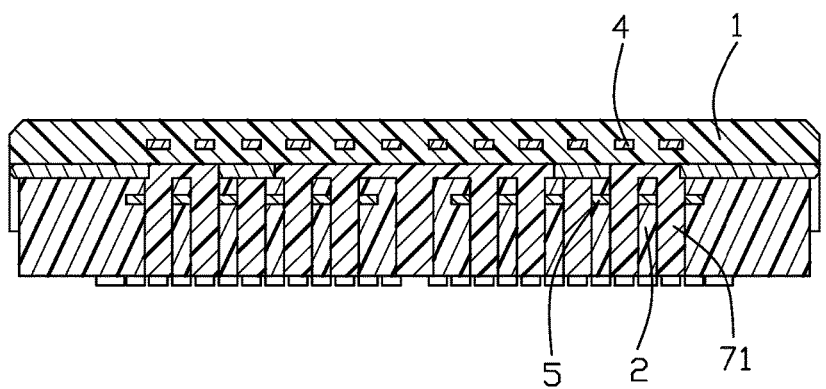
FIG. 10 is a cross-sectional view of the electrical connector to show the relation among the lower contacts, the second insulator and the retainer.
Figure 11:
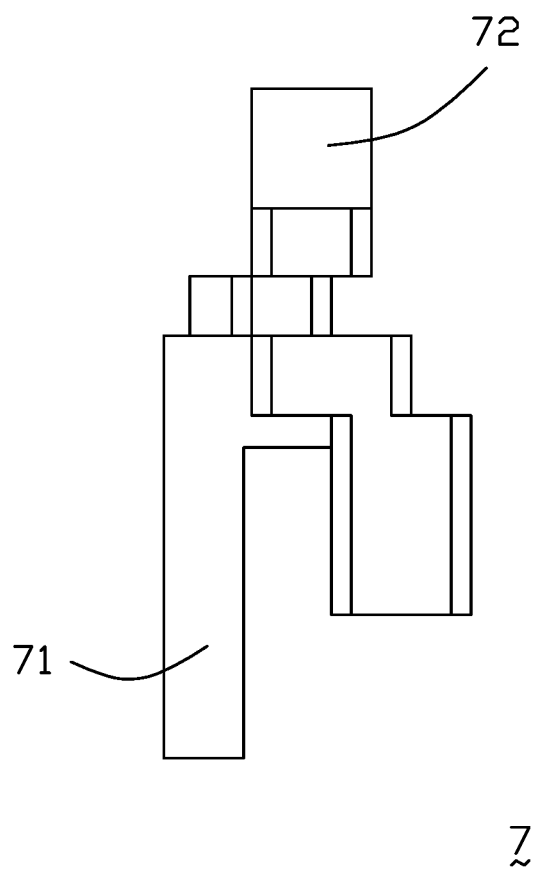
FIG. 11 is a side view of the retainer.

Referring to FIGS. 1-11, an electrical connector 100 comprises a first/upper insulator 1 and a row of first upper contacts 4 retained to the first/upper insulator to commonly form a first/upper contact module via an insert-molding process, a second/lower insulator 2 and a row of second lower contacts 5 retained to the second/lower insulator to commonly form a second/lower contact module via another an insert-molding process, a shielding plate 6 assembled between the first insulator 1 and the second insulator 2, a third/outer insulator 3 over-molded to an assembly of the first insulator 1, the second insulator 2, and the shielding plate 6, and a retainer 7 for securing the first insulator 1 to the second insulator 2 in addition to the third insulator 3.

Referring to FIGS. 1-5, the first insulator 1 has a base 11 and a tongue 12. The base 11 includes a waterproof slot 111 in which all first contacts 4 are exposed for receiving a waterproof glue plate (not shown) therein, a channel with an upper groove 113 and plural lower grooves 114 behind the waterproof slot 111, and a pair of holes 112. The second insulator 2 includes a base 21 and a tongue 22. The base 21 has a waterproof slot 211 in which all second contacts 5 are exposed for receiving the aforementioned waterproof glue plate (not shown), a channel with plural grooves 213 behind the waterproof slot 211, and a pair of latches 212. The third insulator 3 has a base 31 and a tongue 32.

The upper row of contacts 4 and the lower row of contacts 5 are of same number and reversely-symmetrically arranged, as is well known in this art.

The contact 4 and the contact 5 are of same structure and each has a contacting portion 42, a tail portion 43 for soldering to a printed circuit board, and an intermediate portion 41 between the contacting portion and the tail portion. The outermost are ground contacts 410 each having an outer linking part 411.

The shielding plate 6 has a front main part 61, a rear supporting part 62, and a pair of soldering legs 63. The supporting part 62 has a slot 621.

The retainer 7 has a crossbeam 72 and a plurality of posts 71.

Referring to FIGS. 1-6, as can be understood, the electrical connector 100 is generally manufactured in processing steps well known in this art. Specifically, after molding the first and second insulators 1 and 2 with associated contacts 4 and 5 and assembling the shielding plate 6, the third insulator 3 is molded thereto and the retainer 7 is molded in the grooves 113 and 114, the slot 621, and the grooves 213, thereby securely keeping the base 11 of the first insulator 1 and the base 21 of the second insulator 2 together. The retainer 7 is disposed between the third insulator 3 and the rear tails 43 of the first contacts 4. Such securement prevents separation of the first and second insulators 1 and 2 during solder reflowing process.

By provision of the retainer 7 extending through the first insulator 1, the second insulator 2, and the shielding plate 6, either through molding process or by way of inserting operation, the first and second insulators 1 and 2 that are latched on two lateral outer sides of the two rows of contacts 4 and 5 through the holes 112 and the latches 212 are firmly secured together to withstand high temperature in reflow soldering. Notably, the upper contacts 4 extend rearward through the crossbeam 71 while the lower contacts 5 embedded within the base 21 of the second insulator 2 beside the grooves 213 which receive the corresponding posts 72 therein, so that the lower contacts 5 and the posts 72 are alternately arranged snugly with each other along the transverse direction.

Compared with the aforementioned U.S. Pat. No. 9,912,086 using a pair of discrete offset posts located at two opposite ends of the housing to secure the upper contact module and the lower contact module together that may tend to be damaged upon external impact, the invention uses more than three offset posts 71 essentially evenly spread in the housing along the transverse direction and further integrated by the crossbeam 72, thus performing superior and reliable retention between the first insulator 1 and the second insulator 2. Notably, the retainer 7 is located in the base 11 of the first insulator 1 and the base 21 of the second insulator 2 behind the waterproof slot 111 and the waterproof slot 211. In this embodiment, the retainer 7 is essentially located right above the tails of the second lower contacts 5 in the vertical direction.

What is claimed is:

1. An electrical connector comprising:
   a first insulator and a row of first contacts retained to the first insulator, each first contact having a rear tail;
   a second insulator and a row of second contacts retained to the second insulator, each second contact having a rear tail, the rear tails of the second contacts being arranged in front of the rear tails of the first contacts;
   a shielding plate assembled between the first insulator and the second insulator;
   a third insulator molded to an assembly of the first insulator, the second insulator, and the shielding plate; and
   a retainer extending through the first insulator, the second insulator, and the shielding plate, wherein
   the retainer is disposed between the third insulator and the rear tails of the first contacts.

2. The electrical connector as claimed in claim 1, wherein the retainer has a crossbeam and a plurality of posts.

3. The electrical connector as claimed in claim 1, wherein the first insulator is latched to the second insulator on two lateral outer sides of the two rows of contacts and behind the retainer.

4. An electrical connector comprising:
   an upper contact module including a plurality of upper contacts integrally formed within an upper insulator via an insert-molding process;
   a lower contact module including a plurality of lower contacts integrally formed within a lower insulator via another insert-molding process;
   a metallic shielding plate sandwiched between the upper contact module and the lower contact module; and
   a unitary retainer molded upon the upper contact module, the lower contact module and the shielding plate therebetween to combine said upper contact module, said lower contact module and said shielding plate therebetween together; wherein
   said retainer includes a crossbeam extending along a transverse direction, and a plurality of posts extending from the crossbeam in a vertical direction perpendicular to said transverse direction and essentially evenly along the transverse direction and further in an offset manner with regard to the crossbeam in a front-to-back direction perpendicular to both said transverse direction and the vertical direction in a side view along said transverse direction.

5. The electrical connector as claimed in claim 4, wherein the posts are located in front of the crossbeam in the front-to-back direction.

6. The electrical connector as claimed in claim 4, wherein the upper contacts extend through the crossbeam.

7. The electrical connector as claimed in claim 4, wherein the lower contacts are alternately arranged with the lower contacts along the transverse direction.

8. The electrical connector as claimed in claim 7, wherein the lower insulator forms a plurality of grooves to receive the corresponding posts, respectively.

9. The electrical connector as claimed in claim 8, wherein the upper insulator further includes a plurality of lower grooves corresponding to the grooves in the lower insulator.

10. The electrical connector as claimed in claim 4, wherein the upper insulator forms an elongated upper grooves, in which the upper contacts extend, to receive the crossbeam therein.

11. The electrical connector as claimed in claim 4, wherein the metallic shielding plate forms a slot through which the retainer extends.

12. The electrical connector as claimed in claim 4, wherein the retainer is located above tails of the lower contacts in the vertical direction.

13. The electrical connector as claimed in claim 4, wherein the upper insulator includes an upper base and an upper tongue extending forwardly from the upper base in the front-to-back direction, and the lower insulator includes a lower base and a lower tongue extending forwardly from the lower base, and the retained is received in both the upper base and the lower base.

14. The electrical connector as claimed in claim 13, wherein the upper insulator forms a waterproof slot and the lower insulator forms another waterproof slot communicating with said waterproof slot, and the retainer is located behind both said waterproof slot and said another waterproof slot in the front-to-back direction.

15. The electrical connector as claimed in claim 4, wherein said shielding plate is a single piece extending along the transverse direction essentially complete similar to the whole upper contact insulator and lower contact insulator.

16. An electrical connector comprising:
    an upper contact module including a plurality of upper contacts integrally formed within an upper insulator via an insert-molding process;
    a lower contact module including a plurality of lower contacts integrally formed within a lower insulator via another insert-molding process;
    a metallic shielding plate sandwiched between the upper contact module and the lower contact module; and
    a retainer molded upon the upper contact module, the lower contact module and the shielding plate therebetween; wherein
    said retainer extends through all the upper insulator, the shielding plate and the lower insulator in an offset manner in a side view to combine said upper insulator, said lower insulator and said shielding plate therebetween together; wherein
    said retainer is exposed to an exterior both upward and downward in a vertical direction.

17. The electrical connector as claimed in claim 16, wherein the upper insulator includes a waterproof slot in which all the upper contacts are exposed for receiving a waterproof glue plate, and the lower insulator includes another waterproof slot which communicates with said waterproof slot and all lower contacts are exposed in for receiving said waterproof glue plate, and the retainer is located behind both said waterproof slot and said another waterproof slot in a front-to-back direction perpendicular to said vertical direction.

18. The electrical connector as claimed in claim 16, wherein the upper insulator forms a plurality of lower grooves therein, and the lower insulator forms a plurality of grooves respectively corresponding to said lower grooves in an offset manner in a front-to-back direction perpendicular to said vertical direction, and said retainer fills both said lower grooves and said grooves to form corresponding posts.

19. The electrical connector as claimed in claim 18, wherein said posts are spaced from one another in a transverse direction perpendicular to both the vertical direction and said front-to-back direction.

20. The electrical connector as claimed in claim 16, wherein the retainer is located right above tails of the lower contacts in the vertical direction.

\* \* \* \* \*